United States Patent
Navanageri et al.

(10) Patent No.: US 9,697,296 B2
(45) Date of Patent: Jul. 4, 2017

(54) SYSTEM GENERATED CONTEXT-BASED TAGGING OF CONTENT ITEMS

(71) Applicant: Apollo Education Group, Inc., San Jose, CA (US)

(72) Inventors: Shridhar Navanageri, Cupertino, CA (US); Anil Maipady, San Jose, CA (US); Sudhakar Subashchandrabose, San Jose, CA (US); Raghavendra Reddy Mooram, Sunnyvale, CA (US); Narender Vattikonda, San Jose, CA (US)

(73) Assignee: Apollo Education Group, Inc., San Jose, CA (US)

( * ) Notice: Subject to any disclaimer, the term of this patent is extended or adjusted under 35 U.S.C. 154(b) by 81 days.

(21) Appl. No.: 14/636,426

(22) Filed: Mar. 3, 2015

(65) Prior Publication Data
US 2016/0259862 A1  Sep. 8, 2016

(51) Int. Cl.
*G06F 17/30* (2006.01)
(52) U.S. Cl.
CPC .............. *G06F 17/30876* (2013.01)
(58) Field of Classification Search
CPC .................................... G06F 17/30047
USPC ......................................... 707/736
See application file for complete search history.

(56) References Cited

U.S. PATENT DOCUMENTS

| | | | |
|---|---|---|---|
| 8,510,377 B2* | 8/2013 | Coates | G06F 17/30867 709/203 |
| 8,566,329 B1* | 10/2013 | Freed et al. | 707/748 |
| 9,009,162 B1* | 4/2015 | Luo | 707/740 |
| 2007/0198506 A1* | 8/2007 | Attaran Rezaei | G06F 17/30675 |
| 2007/0203903 A1* | 8/2007 | Attaran Rezaei | G06F 17/30873 |
| 2009/0094189 A1* | 4/2009 | Stephens | 707/2 |
| 2009/0132527 A1* | 5/2009 | Sheshagiri | G06Q 30/02 |
| 2009/0164301 A1* | 6/2009 | O'Sullivan | G06Q 30/02 705/14.49 |
| 2009/0254540 A1* | 10/2009 | Musgrove | G06F 17/30613 |
| 2012/0101806 A1* | 4/2012 | Davis | G06Q 50/01 704/9 |
| 2012/0296991 A1* | 11/2012 | Spivack | G06Q 10/10 709/206 |
| 2012/0324002 A1* | 12/2012 | Chen | 709/204 |
| 2013/0046761 A1* | 2/2013 | Soderberg et al. | 707/736 |
| 2013/0185291 A1* | 7/2013 | Tyndall | 707/723 |
| 2014/0278986 A1* | 9/2014 | Rouse | G06Q 30/0256 705/14.54 |
| 2014/0280113 A1* | 9/2014 | Hohwald | 707/728 |

* cited by examiner

*Primary Examiner* — Jean M Corrielus
(74) *Attorney, Agent, or Firm* — Invoke

(57) ABSTRACT

A method for selecting a tag for a content item includes obtaining a first content item; obtaining data associated with a first user; based on the data associated with the first user, selecting a first tag for the first content item; and generating a second content item comprising (a) at least a portion of the first content item and (b) the first tag.

21 Claims, 6 Drawing Sheets

SYSTEM GENERATED CONTEXT-BASED TAGGING OF CONTENT ITEMS

TECHNICAL FIELD

The present disclosure relates to tagging of content. In particular, the present disclosure relates to contextual tagging and recommended actions for content items.

BACKGROUND

Increasing amounts of digital content are produced and shared among users. For example, users may share posts, images, audio, video, articles, and/or other information with one another through social networking service, online forums, question-and-answer (Q&A) systems, and/or other mechanisms for computer-based social interaction. However, such increases in the volume of content may prevent users from finding and accessing content that is relevant or useful. For example, a user of a tech support forum may be required to manually browse content labels and/or individual threads within the forum to find content that is relevant to the user's tech support needs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.
1. GENERAL OVERVIEW
2. ARCHITECTURAL OVERVIEW
3. CONTEXTUAL TAGGING OF CONTENT ITEMS
   3.1 Obtaining a first content item
   3.2 Obtaining data associated with a first user
   3.3 Based on the data associated with the first user, selecting a first tag for the first content item
   3.4 Selecting a ranked plurality of tags for the first content item
   3.5 Generating a second content item containing at least a portion of the first content item and the first tag
   3.6 Publishing the second content item
   3.7 Displaying one or more recommended actions based at least on the first content item and data associated with the first user
   3.8 Creating a profile for the first tag based at least on prior usage associated with the first tag
4. EXAMPLE EMBODIMENT
5. SELECTING A TAG FOR A CONTENT ITEM
6. MISCELLANEOUS; EXTENSIONS
7. HARDWARE OVERVIEW

1. General Overview

The disclosed embodiments provide a method and system for contextual tagging and recommended actions for content items. Such content items may include, but are not limited to text, images, video, audio, and/or multimedia. For example, the content items may include posts on online forums, message boards, social networking sites, photo-sharing sites, video-sharing sites, audio-streaming sites, and/or other mechanisms for digital social interaction.

In one embodiment, to perform contextual tagging of a content item, data associated with a user is obtained. The user may be a creator of the content item or a potential viewer of the content item. Next, one or more tags for the content item are selected based at least on the data. For example, the data may be used to identify a context for creation or use of the content item, and one or more tags may be matched to the context. The tags may also be ranked by popularity, usage, relevance, and/or other attributes. The content item and tags may then be displayed to the same user and/or other users, with the tags ordered and/or displayed according to the ranking. One or more recommended actions may also be displayed based at least on the content item and data. For example, the data may be used to identify actions that are frequently performed by the user, which are then recommended to the user or automatically applied to the content item on the user's behalf.

2. Architectural Overview

Figure 1:
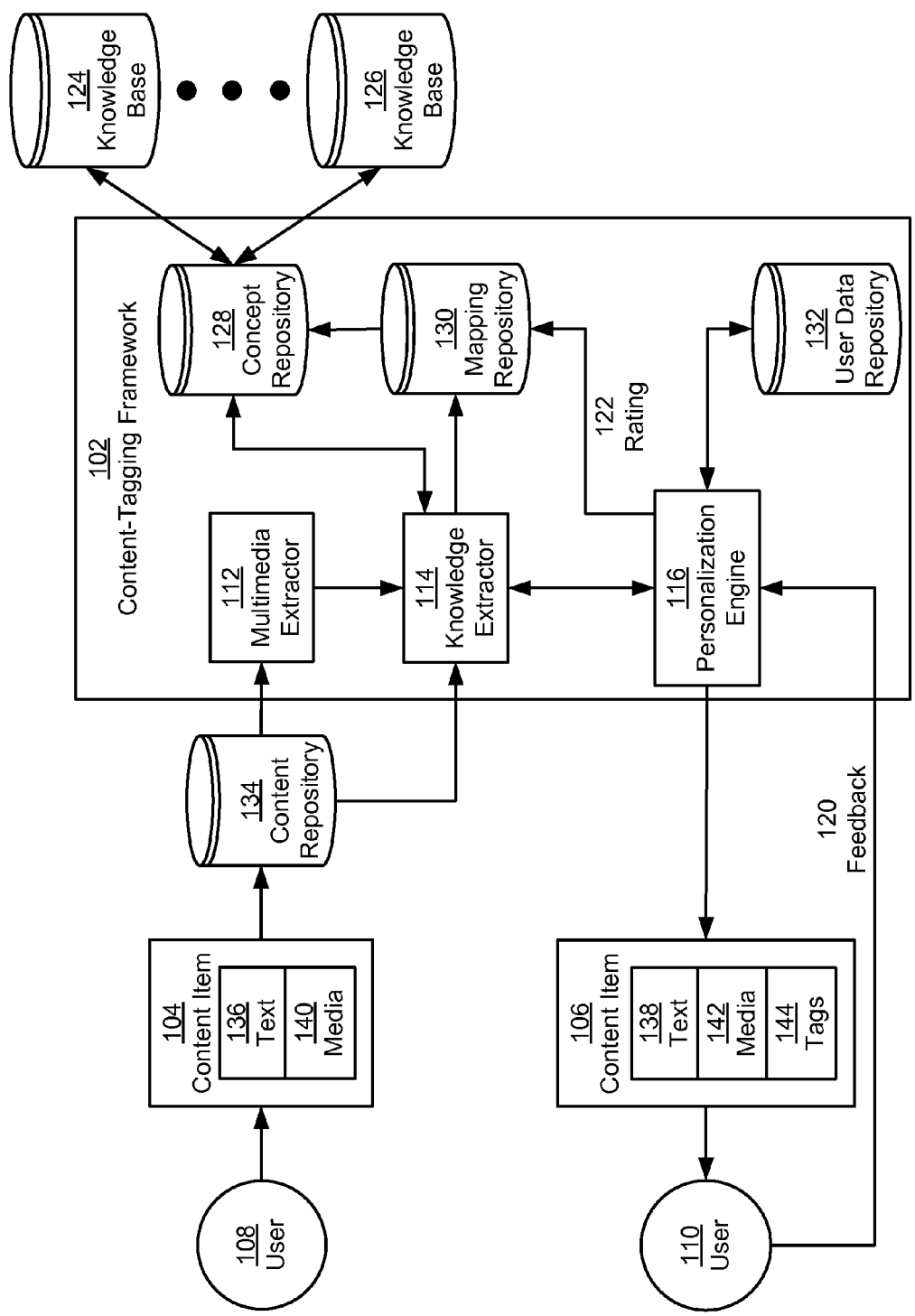
FIG. 1 illustrates a system in accordance with one or more embodiments.

FIG. 1 illustrates a system in accordance with one or more embodiments. As shown in FIG. 1, the system includes a content-tagging framework 102 that is used to automatically generate a set of tags 144 for a content item 104.

In one embodiment, content item 104 is created by a user 108. For example, content item 104 is posted to a social networking service, photo-sharing site, video-sharing site, audio-streaming site, weblog, microblogging service, online forum, and/or other social communications medium by user 108. As a result, content item 104 includes text 136 and/or media 140 such as images, audio, video, and/or multimedia.

After content item 104 is submitted by user 108, content item 104 is stored in a content repository 134 for subsequent retrieval and use. For example, a post to a blog, social networking service, photo-sharing site, video-sharing site, file-sharing site, and/or other content-sharing mechanism may be persisted in a relational database providing content repository 134. Content item 104 may subsequently be retrieved from content repository 134 in response to a query from a web server, application server, virtual machine, and/or other component of the content-sharing mechanism for transmission and/or display to additional users.

As mentioned above, content-tagging framework 102 generates a set of tags 144 for content item 104. Generating a set of tags and selecting a set of tags are used interchangeably herein. In an embodiment, tags 144, as referred to herein, are words or phrases which form labels for corresponding content items. Labels include tags alone or tags in combination with other characters (for example, letters, symbols, or images). In one example, a tag is prefixed with the hash character (or number sign), #, to form a label. Such a label is commonly referred to as a "hashtag". "Tags" are referred to in various examples herein. Variations within the scope of this application include the use of tags alone or tags in combination with other characters.

In an embodiment, tags 144 are displayed with corresponding content items, stored with corresponding content items, used for indexing/grouping content items, and used for searching for content items. A single tag or multiple tags may be associated with any content item.

In an embodiment, tags 144 include labels, keywords, and/or concepts that are relevant to information in content item 104. As shown in FIG. 1, content-tagging framework 102 includes a multimedia extractor 112, a knowledge extractor 114, a personalization engine 116, a master repository 128, a mapping repository 130, and a user data repository 132. Each of these components is described in detail below.

To enable generation of tags 144 from non-text-based information in content item 104, any media 140 in content item 104 (e.g., images, audio, video, multimedia, etc.) may be processed by multimedia extractor 112 to obtain a textual representation of information in media 140. For example, multimedia extractor 112 may identify media 140 in content item 104 based on an Internet media type (e.g., MIME type) of media 140. Multimedia extractor 112 may then use optical character recognition (OCR), speech recognition, face recognition, object detection, and/or another automatic identification and data capture (AIDC) technique to capture text from media 140.

Next, knowledge extractor 114 may process text 136 in content item 104, along with textual representations of media 140 from content item 104, to obtain a set of tags 144 for content item 104. First, knowledge extractor 114 may use a number of text-mining, knowledge-extraction, and/or natural-language processing techniques to match text 136 and/or the textual representations of media 140 to one or more labels in a concept repository 128. Concept repository 128 may be populated with data from one or more knowledge bases 124-128. For example, concept repository 128 may include a variety of ontologies, entities, definitions, concepts, labels, and/or other information from knowledge bases 124-126. As a result, concept repository 128 may include data that can be used to match keywords in content item 104 to one or more concepts. In turn, the concept(s) and/or keywords may be used to obtain a set of tags 144 for content item 104 and establish a set of contexts for tags 144.

Knowledge extractor 114 may also generate one or more rankings of tags 144 based on the popularity, usage, and/or ratings associated with tags 144. The rankings may identify one or more primary tags with higher ratings, popularity, and/or usage, as well as one or more secondary tags that can be used in personalization or customization to the preferences and/or characteristics of specific users. The primary tags may thus be relevant to a general population of users, while the secondary tags may be matched to subsets of users to which the secondary tags may be relevant. The rankings may additionally include localized and/or internationalized variants of the primary and/or secondary tags.

After one or more rankings of tags 144 are generated, knowledge extractor 114 may store a set of mappings between the ranked tags 144 and one or more portions of content item 104 in mapping repository 130. For example, knowledge extractor 114 may map one or more keywords, phrases, sentences, paragraphs, and/or other parts of content item 104 to one or more rankings of tags 144 for content item 104.

Personalization engine 116 may then present a content item 106 containing text 138 and media 142 that include at least a portion of text 136 and media 140 in content item 104, along with one or more tags 144 for content item 104, to another user 110. For example, personalization engine 116 may include some or all of a blog post, article, photo album, video file, audio file, and/or other information from content item 104 in content item 106 and display content item 106 to user 110 through a website, file-sharing service, social-networking service, Q&A system, and/or other content-sharing mechanism. Personalization engine 116 may also customize text 138, media 142, and/or tags 144 in content item 106 based on data for user 108 or user 110 from user data repository 132. For example, personalization engine 116 may obtain user profile data, actions, preferences, geographic regions, and/or characteristics for one or both users 108-110 from user data repository 132. Personalization engine 116 may then select text 138, media 142, and tags 144 for inclusion in content item 106 to conform to the user profile data, user actions, user preferences, and/or user characteristics.

Such customization of content item 106 to individual users may thus improve searching, filtering, sorting, and/or processing of information in content item 106 and/or other content items by the users. For example, personalization engine 116 may display text 138, media 142, and tags 144 that match a user's interests or preferences and omit content that does not match the user's interests or preferences. Personalization engine 116 may additionally provide contexts associated with tags 144 to aid in the user's understanding of tags 144 and/or other information related to text 138 and/or media 142.

Finally, personalization engine 116 may obtain implicit or explicit feedback 110 related to content item 106 from user 110 and update user data repository 132 and/or mapping repository 130 with feedback 110. As shown in FIG. 1, feedback 110 may include a rating 122 associated with one or more parts of content item 106 in mapping repository 130. For example, personalization engine 116 may associate rating 122 with one or more tags in mapping repository 130. Rating 122 may subsequently be used to update one or more rankings of tags 144 for content item 104 in mapping repository 130 and/or a global ranking of tags or objects in concept repository 128. Other types of feedback 110 may include, but are not limited to, actions such as clicks, searches, page views, comments, likes, dislikes, shares, follows, unfollows, and/or hides. Time spent on such actions may also be tracked to identify user interests and attention spans with respect to various types of content.

Personalization engine 116 may further display one or more recommended actions based on content item 104 and data from user data repository 132. For example, personalization engine 116 may identify a pattern of user actions related to certain labels or tags 144 from user 110. To facilitate use or sharing of content item 106 by user 110, personalization engine 116 may recommend one or more of the user actions to user 110 during display of content item 106 to user 110. As an alternative or addition to recommending user actions, personalization engine 116 may automatically perform one or more user actions on behalf of user 110. For example, personalization engine 116 may automatically "like" or share content item 106 on behalf of user 110 to increase use of content item 106 by user 110 and/or other users of a website, mobile application, social networking service, and/or other social communications mechanism in which content item 106 is displayed. Contextual tagging and recommended actions for content items are described in further detail below with respect to FIG. 2.

3. Contextual Tagging of Content Items

Figure 2:
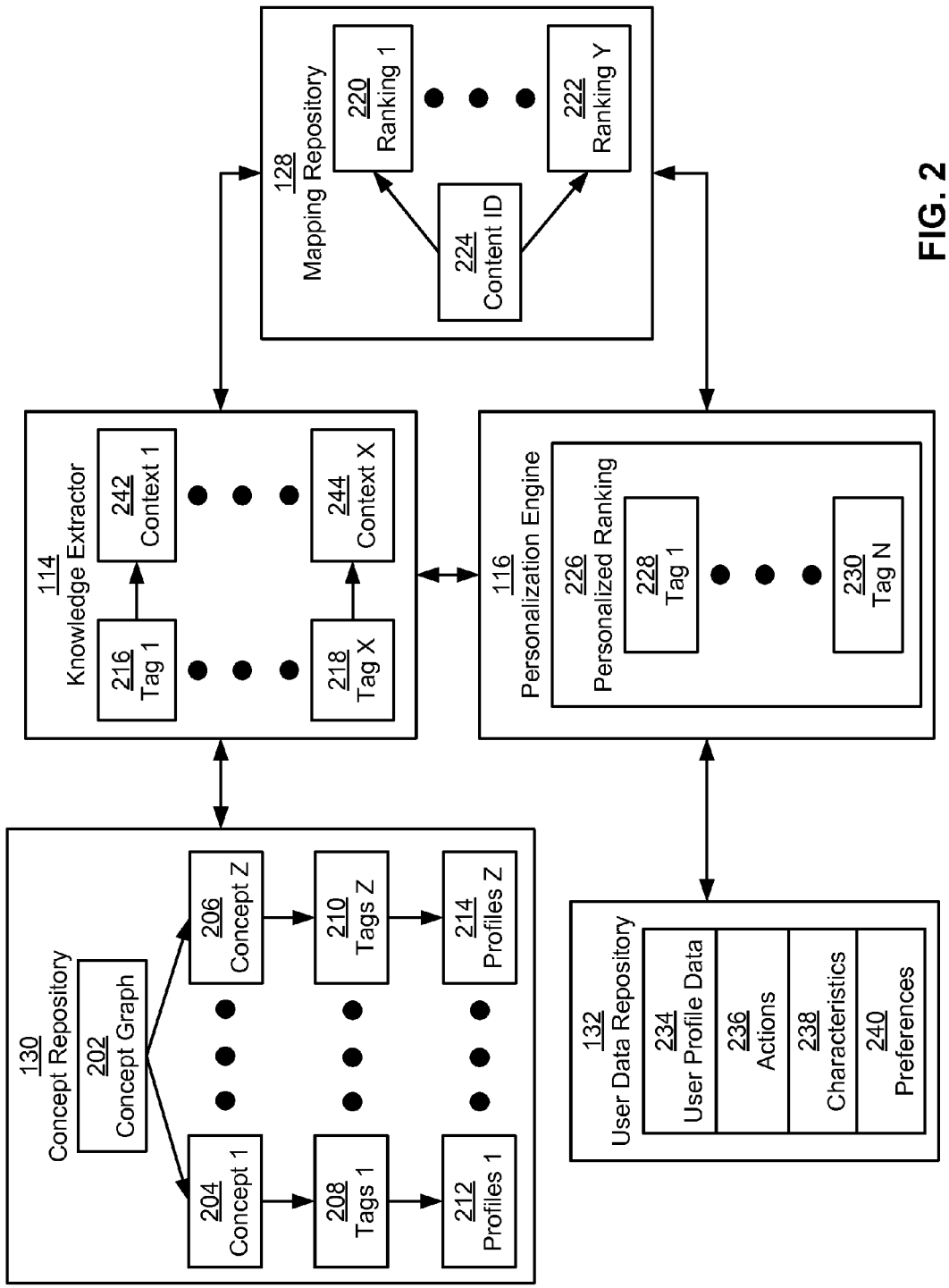
FIG. 2 illustrates the generation of a set of tags for a content item in accordance with one or more embodiments.

FIG. 2 illustrates the generation of a set of tags for a content item in accordance with one or more embodiments. As described above, knowledge extractor 114 may perform context-based selection of tags for the content item.

3.1 Obtaining a First Content Item

First, knowledge extractor 114 may obtain a first content item, such as content item 104 of FIG. 1. Knowledge extractor 114 may retrieve the content item from a content repository, such as content repository 134 of FIG. 1. Alternatively, knowledge extractor 114 may obtain the content item after the content item is created and submitted by a user (e.g., user 108 of FIG. 1) for online publication. For example, knowledge extractor 114 may reside on an electronic device used by the user to create the content item and process the content item independently of storing the content item in the content repository.

As described above, the content item may include text entered by the user and/or images, audio, video, and/or other media submitted by the user. The media in the content item may be pre-processed by a multimedia extractor (e.g., multimedia extractor 112 of FIG. 1) to extract a textual representation of the media, and the textual representation may be included with any user-entered text in the version of the content item obtained by knowledge extractor 114.

3.2 Obtaining Data Associated with a First User

Knowledge extractor 114 and/or personalization engine 116 may also obtain data associated with a first user from user data repository 132. Such data may include user profile data 234, actions 236, characteristics 238, and/or preferences 240 associated with the user. User profile data 234 may include data associated with the user's digital identity. For example, user profile data 234 may include a name, username, location, address, phone number, email address, date of birth, gender, and/or other personally identifiable information for the user.

Actions 236 may include user actions related to a social networking service, photo-sharing site, file-sharing site, video-sharing site, and/or other social communications mechanism through which content items can be created, viewed, and/or shared. For example, actions 236 may be tracked as searches, page views, clicks, likes, dislikes, shares, comments, follows, ignores, hides, ratings, and/or other use of the social communications mechanism by the user. Actions 236 may also include time spent on searching, browsing, and/or viewing content on the social communications mechanism. Actions 236 may be applied to tags in the social communications mechanism. For example, actions 236 may include the manual creation, deletion, ranking, rating, and/or clicking of tags by the user. Similarly, actions 236 may include "subscribing" to a tag to view content associated with the tag and/or the addition of a tag to a blacklist that triggers the filtering of content associated with the tag from view.

Characteristics 238 of the user may be explicit (e.g., stated in user profile data 234) or inferred. For example, characteristics 238 may include a political affiliation, a level of education, an occupation, an industry, a skill, a marital status, an income level, a nationality, an ethnicity, a personality trait, a temperament, a habit, and/or a language of the user.

Preferences 240 may relate to usage of the social communications mechanism by the user. For example, the user may provide one or more preferences 240 for "subscribing" to particular tags, labels, categories, or authors of content items in the social communications mechanism. Similarly, the user may provide one or more negative preferences 240 for omitting certain tags, labels, categories, or authors of content items from the user's view. Preferences 240 may also be used to modify the presentation of content to the user. For example, preferences 240 may be applied to the formatting, density, number of tags, and/or amount of text shown to the user for each content item.

As with characteristics 238, preferences 240 may also be implicit. For example, the user's positive preference for sports-related articles, posts, photos, videos, and/or other content items may be inferred from the user's tendency to like, share, rate highly, spend time on, or comment positively on sports-related content. Conversely, the user's negative preference toward political content may be inferred from the user's tendency to hide, ignore, rate lowly, spend little to no time, and/or comment negatively on content items containing political concepts or tags.

3.3 Based on the Data Associated with the First User, Selecting a First Tag for the First Content Item Knowledge extractor 114 may use data from concept repository 130 and/or user data repository 132 and one or more knowledge-extraction, text mining, and/or natural-language processing techniques to select one or more tags (e.g., tag 1 216, tag x 218) for the content item. Selecting a tag may include adding a tag to a content item or replacing a previously associated tag for the content item. For example, knowledge extractor 114 may use topic extraction, named entity recognition, named entity resolution, named entity coreference, terminology extraction, taxonomy induction, ontology extraction, and/or topic linking techniques to identify a set of tags for the content item. The tags may include keywords found in the content item and/or words related to concepts (e.g., concept 1 204, concept z 206) or topics found in the content item.

During selection of tags for the content item, knowledge extractor 114 may use a concept graph 202 in concept repository 130 to identify concepts in the content item. Concept graph 202 may include a set of nodes representing concepts (e.g., concept 1 204, concept z 206) and a set of edges linking related concepts in concept graph 202. Each concept in concept graph 202 may also be associated with a set of tags (e.g., tags 1 208, tags z 210). In turn, each tag may be associated with a profile (e.g., profiles 1 212, profiles z 214), which includes metadata associated with a definition, usage, and/or context (e.g., context 1 242, context x 244) of the tag. As a result, concept graph 202 may provide an ontology of concepts that allows knowledge extractor 114 to extract relevant tags from the content item and provide a context that improves understanding and use of each tag, as discussed in further detail below.

More specifically, related concepts may be linked to one another using edges within concept graph 202. Knowledge extractor 114 may match keywords extracted from the content item to one or more concepts (e.g., concept 1 204, concept z 206) and/or tags (e.g., tags 1 208, tags z 210) in concept graph 202. The related concepts may also be used to determine relevant contexts or definitions for the tags. For example, a "web" tag may be used in a technology context if the content item includes or is associated with words such as "website," "URL," "connection," "data," and/or "network." On the other hand, the "web" tag may be used in a biology context if the content item includes or is associated with words such as "spider," "threads," "weave," "spin," "prey," and/or "silk."

Knowledge extractor 114 may also use concept graph 202 to identify tags that describe information in the content item but are not explicitly found in the content item. For example, knowledge extractor 114 may use the nodes and edges in concept graph 202 identify one or more concepts that are related to a concept in the content item and add tags from the related concepts to the set of tags for the content item. Similarly, knowledge extractor 114 may include localized or internationalized versions of a tag in the set of tags for the content item. For example, a content item to be displayed with a tag "turn signal" is obtained. A determination is made that the user to which the content item is to be displayed is located in India. A further determination is made that a "turn signal" is referred to as "indicators" or "blinkers" in India. Based on the user's characteristics (location in this example), the tag is modified from "turn signal" to "blinker" and displayed with the corresponding content item. Alternatively, if the content item was not already associated with the tag "turn signal", "blinker" is selected from a group of candidate tags including "turn signal" and "blinker" based on the user's location. Use of concept graphs to generate tags for content items is described in further detail below with respect to FIGS. 3-4.

Knowledge extractor 114 may then use profiles of the tags from concept graph 202 to build contexts (e.g., context 1 242, context x 244) for the tags. Each profile may include metadata related to the corresponding tag. As mentioned above, tags and profiles in concept graph 202 may initially be populated using one or more knowledge bases. As a result, a profile for a tag may include a type or attribute of the tag, such as "person," "place," "organization," "hardware," "software," "event," "creative work," "species," and/or "position." The profile may also include a description of the tag, such as a definition of an object or entity represented by the tag. The profile may additionally include links that represent relationships between the tag and other tags in the ontology.

Those skilled in the art will appreciate that each tag may have more than one profile. For example, a tag of "Lollipop" may have one profile related to a confectionary and another profile related to a version of a mobile operating system. Knowledge extractor 114 may select the appropriate profile for a given tag based on the tag's context to facilitate understanding and use of the tag by a user. Continuing with the above example, knowledge extractor 114 may use other keywords and/or tags in the content item to identify the use of the word "Lollipop" in the content item as related to the mobile operating system and include the profile of the "Lollipop" mobile operating system in the context for a "Lollipop" tag of the content item.

The context for a given tag may include information that clarifies or defines the tag with respect to information in the content item. For example, the context may include the definition of the tag from the selected profile and/or usage statistics (e.g., views and ratings) associated with the selected profile.

Knowledge extractor 114 may additionally obtain one or more tags from the user who created the first content item. For example, knowledge extractor 114 may display tags and/or contexts generated using knowledge-extraction techniques and concept repository 130 to the user. The user may select one or more of the tags for inclusion with the second content item, manually add (e.g., type in) other tags for inclusion with the second content item, and/or remove one or more of the tags from inclusion with the second content item. The user may apply the tags to selected portions of the first content item, or the user may conversely remove portions of the first content item from matching with concepts or tags by knowledge extractor 114.

The user may also approve or modify the contexts of the tags before the tags and contexts are published and/or used with the second content item. For example, the user may provide or select a definition of a tag for use with the second content item that is different from the definition selected by knowledge extractor 114, personalization engine 116, and/or another component of the system. The user-provided definition may be stored in a new profile for the tag in concept repository 130 for subsequent use with other instances of the tag. Consequently, one or more tags for the content item may be selected based on other tags that have been selected for the content item and/or as replacements for the other tags.

The user may also provide metadata for excluding transmission or display of the second content item to certain groups of people. For example, the user may create a "blacklist" that includes tags, topics, concepts, and/or other elements of concept repository 130 that should not be used with the second content item. Anything in the blacklist may thus be excluded as a tag and/or other label for the first or second content item. Similarly, if another user searches or browses for a tag, topic, concept, and/or element on the blacklist, the second content item may be excluded from display in response to the search or browsing activity.

3.4 Selecting a Ranked Plurality of Tags for the First Content Item

After a set of tags (e.g., tag 1 216, tag x 218) and a set of associated contexts (e.g., context 1 242, context x 244) are generated for the content item, knowledge extractor 114 may create a number of rankings (e.g., ranking 1 220, ranking y 222) of subsets of the tags and the associated contexts and map a content identifier (ID) 224 for the content item to the rankings in mapping repository 128. Knowledge extractor 114 may alternatively or additionally map portions of the content item to rankings of tags associated with the portions. For example, knowledge extractor 114 may map a subset of the content item (e.g., one or more words, phrases, sentences, and/or paragraphs) to a ranking of tags for the subset.

Tags in each ranking may be ordered by popularity, importance, relevance, and/or other attributes. For example, a set of tags for a portion of the content item may be ranked by popularity according to profiles for the tags and/or concepts associated with the tags from concept repository 130. A tag's position in the ranking may also be based on user profile data 234, actions 236, characteristics 238, and/or preferences from user data repository 132 for the user creating the content item and/or a user consuming (e.g., viewing) the content item. For example, a tag that is relevant to the inferred or explicit interests or preferences of the user may be ranked higher than a tag that is not relevant to the user's interests or preferences.

Tags may also be included in or excluded from rankings based on data from multiple users. For example, user data for two or more members of the same team and/or community may be combined and used to identify a ranking of tags that is relevant the preferences or characteristics of all users in the team and/or community. In another example, user data for both the creator and consumer of the content item may be used to create one or more rankings of tags for the content item.

Separate sets of rankings may further be generated for different localized and/or internationalized variants of the tags. For example, a different ranking of tags may be created for each language, dialect, colloquial language, non-standard (e.g., slang) language, and/or linguistic variation of a concept, topic, label, or entity represented by the tags.

Those skilled in the art will appreciate that rankings of tags may be represented in various ways. For example, each tag may be assigned a unique number representing the tag's position in the ranking (e.g., 1-15 for a ranking containing 15 tags). Alternatively, tags may be grouped within the ranking according to the tags' relative importance such that tags in a "primary" group of the ranking are more important or relevant to a general group of users, while tags in a "secondary" group of the ranking may be pertinent to select subsets of users.

3.5 Generating a Second Content Item Containing at Least a Portion of the First Content Item and the First Tag After the rankings are generated for the content item, personalization engine 116 may generate a second content item (e.g., content item 106 of FIG. 1) containing at least a portion of the original content item and a personalized ranking 226 of tags (e.g., tag 1 228, tag n 230) for the second content item. The portion of the original content item may be selected for inclusion in the second content item based on data for a user consuming the second content item. For example, personalization engine 116 may select one or more sentences, paragraphs, and/or other portions of the original content item for inclusion in the second content item based on the consuming user's user profile data 234, actions 236, characteristics 238, and preferences 240 with respect to specific tags, concepts, and/or other entities in concept repository 130.

Similarly, personalization engine 116 may select, filter, and/or reorder a ranking (e.g., ranking 1 220, ranking y 222) of tags for the original content item from mapping repository 128 based on the consuming user's data from user data repository 132 to create personalized ranking 226 for the user. For example, personalization engine 116 may obtain a first list of tags in which the user has expressed an explicit or inferred positive preference (e.g., as a subscription or interest), as well as a second list of tags in which the user has expressed a lack of interest or negative preference (e.g., as a "blacklist" of excluded tags). Personalization engine 116 may then obtain a primary and secondary ranking of tags from mapping repository 128, which include tags that are targeted to the user's geographic region and/or language. Personalization engine 116 may add tags from the primary and secondary rankings that are also found in the first list to personalized ranking 226 and omit tags from the primary and secondary rankings that are also found in the second list from personalized ranking 226. In other words, tags in personalized ranking 226 may be selected and combined from one or more rankings in mapping repository 128 to accommodate the user's explicit or inferred choice of language, interests, and/or content.

3.6 Publishing the Second Content Item

The second content item may then be published for display to the consuming user by personalization engine 116 and/or another component of the system. For example, the second content item may be displayed in a "news feed" or "stream" of content to the user, in response to a search by the user, and/or after the user has navigated or browsed to the second content item within a website and/or social communications mechanism.

While the second content item is displayed to the user, tags in personalized ranking 226 may be shown as hashtags and/or other metadata tags. The user may interact with the metadata tags to view contexts associated with the metadata tags. For example, the user may mouse-over and/or select a hashtag to view a type, definition, statistic, and/or other description or information related to the hashtag, as used within the context of the second content item. The displayed information may thus improve the user's understanding and use of the hashtag with the second content item. Display of content items, tags, and/or contexts is described in further detail below with respect to FIG. 4.

The second content item may also include a portion of a third content item that is determined to be relevant to the first content item and/or one or more tags for the first content item. For example, personalization engine 116 may combine portions of two or more articles, blog posts, comments, and/or other content items containing the same tag about an academic subject or course into the second content item to provide information from multiple sources on the academic subject. The combined content item may be generated and/or provided in response to search or browsing activity related to the tag by a user. The combined content item may also be generated based on user profile data 234, actions 236, characteristics 238, and/or preferences 240 from user data repository 132. For example, inferred or explicit preferences 240 of the user for viewing content from multiple content items may be used to determine the portions of two or more content items to be included or left out in the combined content item. Preferences 240 may also be used to order the portions of the content items in the combined content item. After the combined content item is displayed to the user, the user may select (e.g., click) a portion of a content item included in the combined content item to navigate to the full text and/or media contents of the content item.

As mentioned above, the second content item may be excluded from display to certain users if the second content item includes concepts and/or tags on a blacklist associated with the users. Conversely, the second content item may be featured and/or delivered to certain users if the second content item includes concepts and/or tags on a whitelist associated with the users. Such blacklists and/or whitelists may be maintained for multiple groups of users to implement an adjustable policy for distributing content to the users. For example, the creator of the first content item may highlight a portion of the first content item and tag the portion with a restricted tag such as "war" or "adult." In turn, the portion may be omitted from content items that are distributed to children and/or users who have explicitly added the tag to their blacklists.

3.7 Displaying One or More Recommended Actions Based at Least on the First Content Item and Data Associated with the First User Personalization engine 116 and/or another component of the system may also use data from user data repository 132 to identify patterns associated with user actions (e.g., actions 236) that are frequently or commonly performed on content items. If the first content item matches an identified pattern of actions 236 for a user from user data repository 132, the component may automatically apply the same type of action to the content item on the user's behalf. For example, the component may determine that the user regularly "likes" content items related to certain tags, concepts, and/or contexts and perform a "like" action on the user's behalf.

Alternatively, the component may use the identified pattern to display one or more recommended actions to be performed on the first content item. For example, the component may determine that the user commonly posts a "Thank you" comment in response to content items that address the user's questions in an online forum or Q&A system. To streamline the posting of such comments by the user, the component may provide a user-interface element (e.g., a button) that the user may select to automatically post a "Thank you" in response to each answer to a question from the user.

3.8 Creating a Profile for the First Tag Based at Least on Prior Usage Associated with the First Tag Personalization engine 116 and/or another component of the system may receive, from the consuming user, feedback (e.g., feedback 120 of FIG. 1) related to the published content item and/or tags. The feedback may be used to update data for the user in user data repository 132, rankings of the tags in mapping repository 128, and/or profiles of the tags in concept repository 130.

As described above, the feedback may include a rating (e.g., rating 122 of FIG. 1) associated with a tag, a context of the tag, and/or another portion of the published content item. For example, a positive rating may confirm the relevance or usefulness of the tag or context with respect to the content item. On the other hand, a negative rating may indicate a lack of relevance or usefulness of the tag or context with respect to the content item. The positive rating may increase the prominence, popularity, and/or visibility of the corresponding tag or context in concept repository 130 and/or mapping repository 128, while the negative rating may reduce the prominence, popularity, and/or visibility of the tag or context in concept repository 130 and/or mapping repository 128.

Prior usage (e.g., feedback, ratings, user actions, time spent, etc.) associated with a given tag or context may be included in the profile of the tag and used in subsequent selection of the tag for one or more content items. For example, a tag that is consistently rated highly may be placed higher in rankings than a tag that is less consistently rated highly. Similarly, a context that is deemed relevant to a tag (e.g., based on other keywords in content items associated with the tag and context) by users may be used more frequently with the tag than a context that is determined to be irrelevant. Consequently, the system of FIG. 2 may adapt over time to the usage and contexts of various concepts and topics found in content items.

4. Example Embodiment

Figure 3:
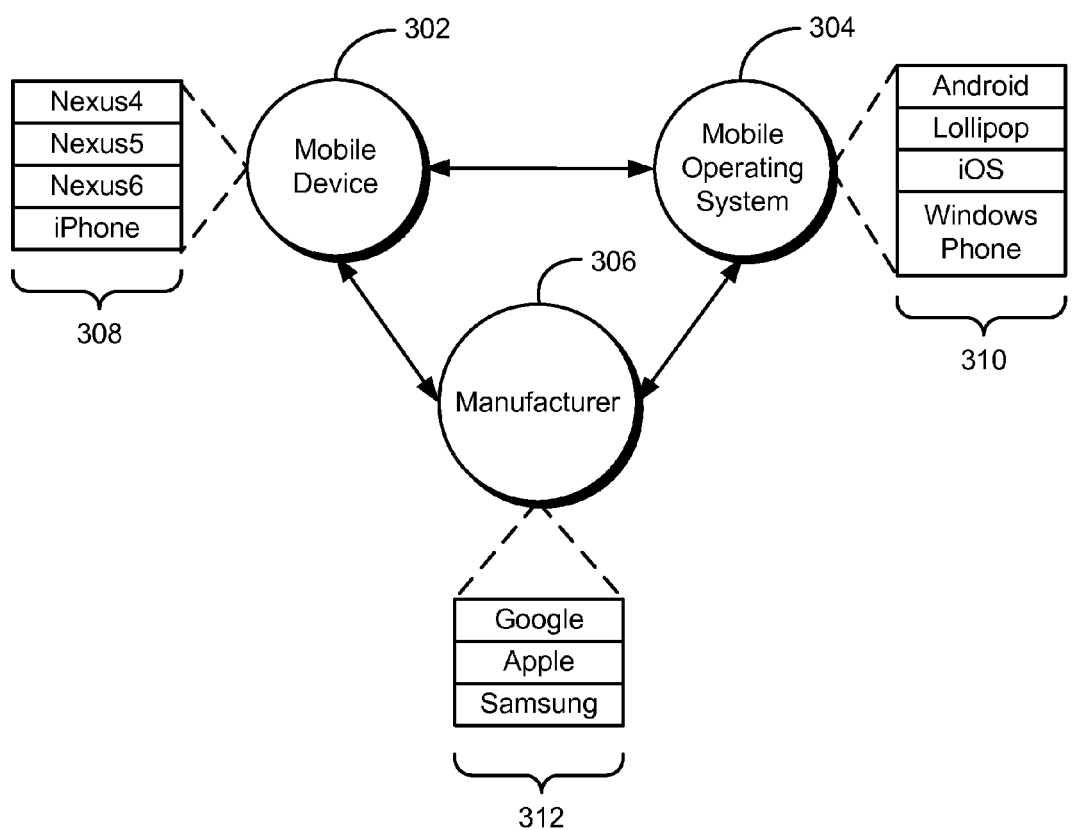
FIG. 3 shows an example concept graph in accordance with one or more embodiments.

FIG. 3 illustrates an example concept graph (e.g., concept graph 202 of FIG. 2) in accordance with one or more embodiments. Operations or components described in relation to this example should not be construed as limiting the scope of other embodiments.

The concept graph includes a number of nodes 302-306 representing related concepts of "Mobile Device," "Mobile Operating System," and "Manufacturer," respectively. For example, nodes 302-306 may be interconnected within the concept graph because a mobile operating system runs on a mobile device and both mobile devices and mobile operating systems have manufacturers.

Each node 302-306 may also be associated with a set of tags 308-312. For example, the "Mobile Device" node 302 may include tags 308 such as "Nexus4," "Nexus5," "Nexus6," and "iPhone." The "Mobile Operating System" node 304 may include tags 310 such as "Android," "Lollipop," "iOS," and "Windows Phone." The "Manufacturer" node 306 may include tags such as "Google," "Apple," and "Samsung." Consequently, tags 308-312 may represent specific instances or values of concepts represented by the corresponding nodes 302-306.

Each tag may also include one or more profiles that include definitions, usage statistics, and/or other metadata associated with the corresponding concept. For example, profiles for tags 308 may be populated with metadata related to a mobile device context. Profiles for tags 310 may be populated with metadata related to a mobile operating system context. Profiles for tags 312 may be populated with metadata related to a mobile device manufacturer and/or a mobile operating system manufacturer context.

Because node 306 may represent a manufacturer of a mobile device or a mobile operating system, tags 312 may include multiple profiles. For example, the "Apple" tag may include a profile for use of the tag in the context of a mobile device manufacturer and a separate profile for use of the tag in the context of a mobile operating system manufacturer. Alternatively, the same profile may be used to define and track usage of the "Apple" tag as both a mobile device manufacturer and a mobile operating system manufacturer. Nodes 302-306, tags 308-312, and profiles for tags 308-312 may then be used to generate a set of contextual tags for a content item, as described below with respect to FIG. 4.

Figure 4:
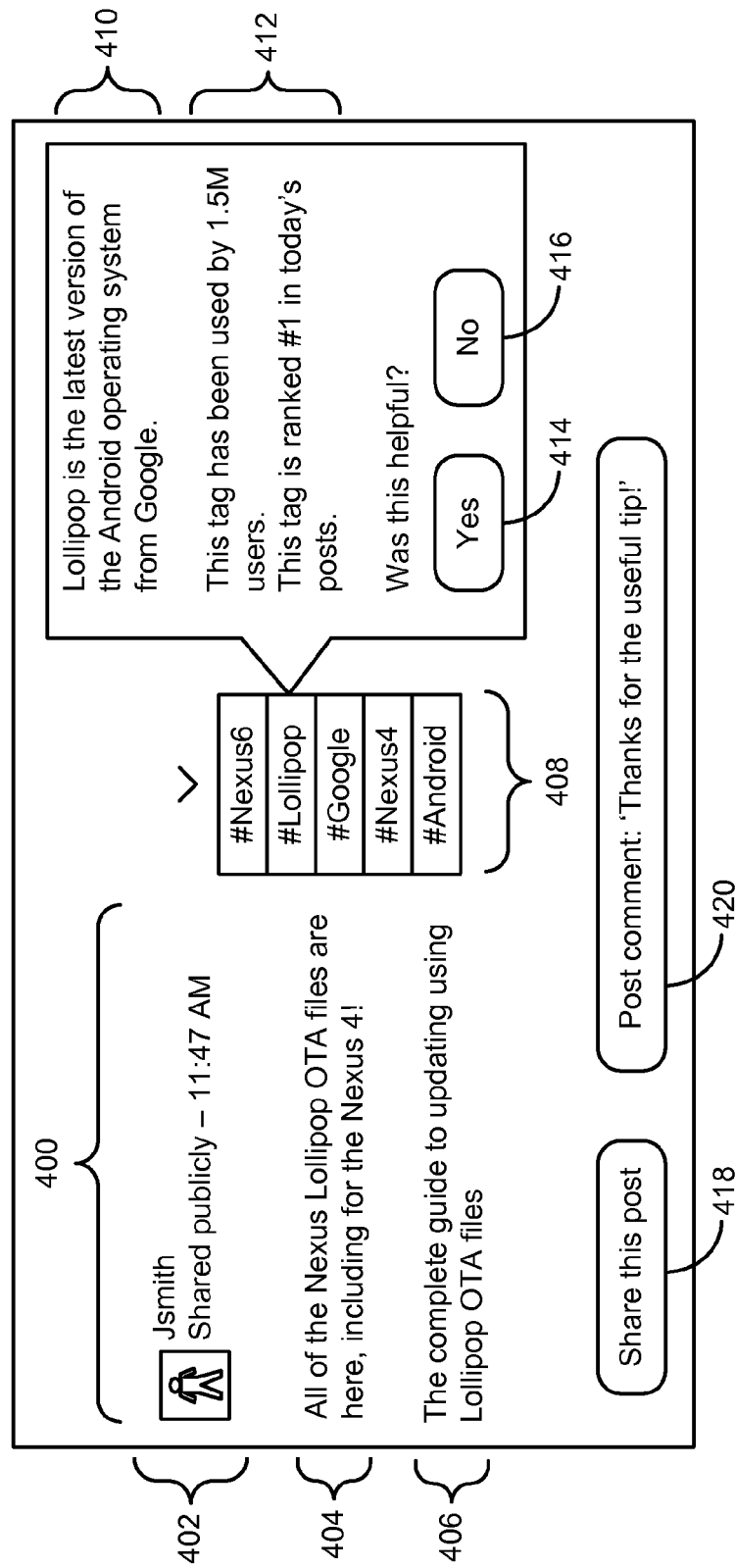
FIG. 4 illustrates an example screenshot in accordance with one or more embodiments.

FIG. 4 illustrates an example screenshot in accordance with one or more embodiments. More specifically, FIG. 4 shows a screenshot of a user interface associated with a content-tagging framework, such as content-tagging framework 102 of FIG. 1. The user interface includes a text-based content item 400 such as a blog post, news feed post, forum post, message, and/or article. Content item 400 may also include one or more media files (not shown) such as images, audio, video, and/or multimedia.

As shown in FIG. 4, content item 400 includes a number of portions 402-406. Portion 402 may include information related to the creation of content item 400, such as a username (e.g., "Jsmith") of the creator of content item 400, a time (e.g., "11:47 AM") at which content item 400 was created or published, and/or a publication status (e.g., "Shared publicly") of content item 400. Portion 404 may include text (e.g., "All of the Nexus Lollipop OTA files are here, including for the Nexus 4!") posted by the user, and portion 406 may include additional text (e.g., "The complete guide to updating using Lollipop OTA files") that is related to the text of portion 404. For example, both portions 404-406 may be written and submitted together or separately by the same user, or portions 404-406 may be written by different users. If portions 404-406 are submitted separately, portions 404-406 may be combined into content item 400 based on the similarity of or overlap in keywords, topics, concepts, and/or themes found in both portions 404-406.

Content item 400 may also be displayed with a list 408 of tags such as hashtags. As described above, list 408 may be generated by analyzing one or more portions 404-406 of text in content item 400. Tags in list 408 may be extracted from text in portion 404 and/or portion 406 using a number of text-mining, knowledge extraction, and/or natural-language processing techniques. The "Lollipop" and "Nexus4" tags may be obtained as keywords from one or both portions 404-406, while the "Nexus6," "Google," and "Android" tags may be included based on concepts associated with the "Lollipop" and "Nexus4" tags. For example, the "Lollipop" and "Nexus4" keywords may be extracted from portions 404-406, and the combination of the two keywords may be matched to the concept graph of FIG. 3 to identify common concepts associated with the keywords, such as mobile operating systems, mobile devices, and manufacturers of mobile operating systems and mobile devices. The concepts may then be used to add the "Nexus6" (e.g. the name of a mobile device), "Google" (e.g., a manufacturer of a mobile operating system), and "Android" (e.g., the name of a mobile operating system) tags to list 408, even though such tags do not appear directly in portions 404-406.

Tags may be included and/or ranked in list 408 based on user data associated with the creator of content item 400. For example, one or more tags may be verified and/or manually added by the creator of portion 404 and/or portion 406 before the tags are added to list 408. The creator may also select portion 404 and/or portion 406 as a subset of a larger content item (e.g. an article) and manually tag the portion with a tag in list 408. In turn, the selected portions 404-406 may be included in content item 400 in lieu of the entire text of one or more content items from which portions 404-406 are obtained if content item 400 is generated in response to a search containing the tag.

Similarly, tags may be included and/or ranked in list 406 based on user data associated with a consumer (e.g., a viewer) of content item 400. For example, the "Nexus6" tag may be added to and ranked at the top of list 406 to the consumer because the "Nexus4" tag appears in content item 400 and under node 302 of the concept graph of FIG. 3, the "Nexus6" tag appears under the same node 302, and the consumer owns a mobile device with the same name. The "Nexus4" tag may appear lower in list 406 because the tag may have less personal relevance to the consumer, even though the phrase "Nexus 4" is found in content item 400. On the other hand, the "Nexus4" tag may be ranked higher than the "Nexus6" tag in a generic ranking of tags for content item 400 from a mapping repository (e.g., mapping repository 128 of FIG. 1) because the phrase "Nexus 4" in portion 404 makes the "Nexus4" tag likely to be relevant to more users than the "Nexus6" tag.

A different consumer may be shown a different set and/or ranking of tags in list 406. For example, a consumer of content item 400 who owns a "Nexus 5" mobile device may be shown a "Nexus5" tag at the top of list 406 instead of "Nexus6." Display of content item 400 to a user may also be omitted if the user has negative preferences associated with one or more tags in list 408. If information related to the consumer's mobile device is not available, a more generic tag (e.g. "Lollipop" or "Android") may be placed at the top of list 408 in lieu of a specific mobile device brand or model.

The user interface also includes contextual information associated with the "Lollipop" tag. As shown in FIG. 4, the contextual information includes a context-based definition 410 (e.g., "Lollipop is the latest version of the Android operating system from Google.") of the tag and usage statistics 412 (e.g., "This tag has been used by 1.5M users. This tag is ranked #1 in today's posts.") for the tag. The contextual information may be shown in response to an action from the consumer, such as hovering a cursor over the "Lollipop" tag in list 408. The user may click on the tag to search for other content items containing the same contextual tag, "subscribe" to content items containing the same contextual tag, add the tag to a blacklist, and/or perform other actions associated with the tag.

Definition 410 and usage statistics 412 may be based on the context of the tag, as determined by the knowledge-extraction techniques applied to portions 404-406. For example, definition 410 and statistics 412 may be obtained from a profile related to a mobile operating system context of the tag instead of another (e.g., confectionary) context because keywords from content item 400 may match concepts related to mobile devices and mobile operating systems from the concept graph of FIG. 3 instead of concepts related to confectionary. A different definition and/or set of statistics may be shown for the "Lollipop" keyword if content item 400 is determined to use "Lollipop" in the confectionary context.

The consumer may rate the usefulness and/or relevance of definition 410 and/or statistics 412 by interacting with two user-interface elements 414-416 in the user interface. For example, the consumer may select user-interface element 414 (e.g., "Yes") to confirm the usefulness or relevance of definition 410 and/or statistics 412 and user-interface element 416 (e.g., "No") to identify a lack of usefulness or relevance of definition 410 and/or statistics 412. The consumer (e.g., reader) may also "block" certain tags by interacting with a provided user interface for the tag. In other words, if the consumer thinks a certain tag is not relevant or is no longer interested in the tag (e.g., due to a seasonal nature of the tag), he may inform the system to suppress content pertaining to the tag.

Input from the consumer and/or other consumers of the tag and/or content item 400 may be aggregated into a profile for the tag and/or content item 400 and used to update the subsequent ranking of tags in list 408 and/or presentation of content item 400 to other consumers. For example, the profile for the "Lollipop" tag may track the number of views of the contextual tag and the number of positive (e.g., "Yes") ratings for the tag. If the tag is rated highly by viewers, the tag's ranking in list 408 may increase. If the tag is not rated highly by viewers, the tag's ranking in list 408 may decrease. If the tag's rating falls below a threshold, the tag may be removed from list 408.

Finally, the user interface includes a number of user-interface elements 418-420 containing recommended actions. Recommended actions may be included in user-interface elements 418-420 based on patterns of actions by the user with other content items. For example, user-interface elements 418-420 may be generated upon detecting that the user frequently shares and/or comments on content items with similar tags, concepts, and/or topics.

The user may select each user-interface element 418-420 to perform the corresponding recommended action. For example, the user may select user-interface element 418 (e.g., "Share this post") to share content item 400 with other users in a social network, or the user may select user-interface element 420 (e.g., "Post comment: 'Thanks for the useful tip!'") to post a comment in response to content item 400.

5. Selecting a Tag for a Content Item

Figure 5:
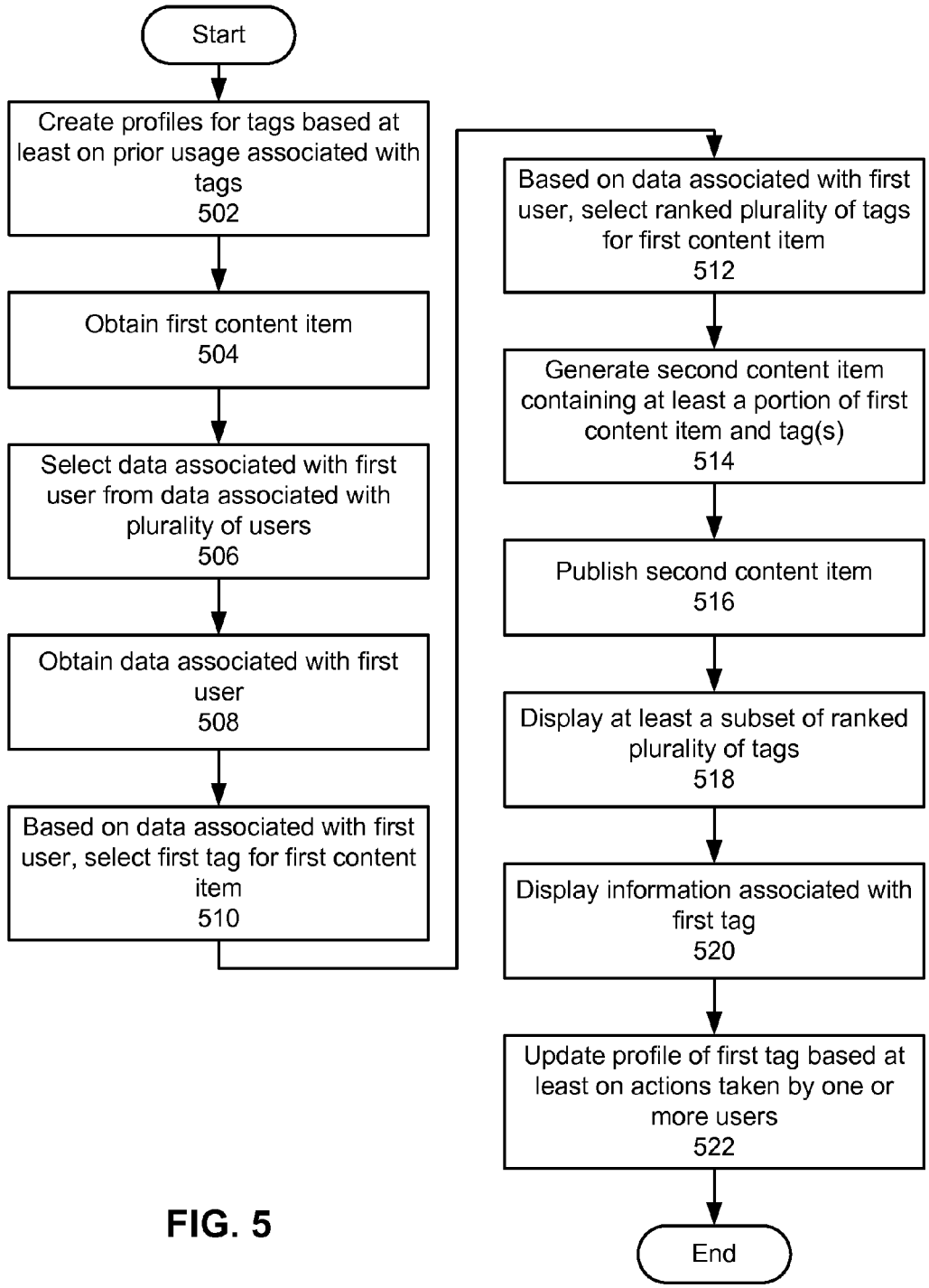
FIG. 5 illustrates a flowchart of selecting a tag for a content item in accordance with one or more embodiments.

FIG. 5 illustrates a flowchart of selecting a tag for a content item in accordance with one or more embodiments. In one or more embodiments, one or more of the steps may be omitted, repeated, and/or performed in a different order. Accordingly, the specific arrangement of steps shown in FIG. 5 should not be construed as limiting the scope of the embodiments.

First, profiles for a set of tags are created based at least on prior usage associated with the tags (operation 502). The profiles may include descriptions, definitions, types, relationships, and/or other metadata associated with the tags. As a result, each profile may represent a different context in which a given tag can be used. The profiles may also track the prior usage of the tags. For example, the prior usage may include a total number of views of each tag, as well as an aggregate rating (e.g., numeric rating, number of positive ratings, number of negative ratings, etc.) of the tag.

Next, a first content item is obtained (operation 504). The content item may include text and/or media in a message generated by a user to publish online. If the content item includes media (e.g., audio, video, images, multimedia, etc.), one or more AIDC techniques may be used to obtain a textual representation of information in the media for further processing.

Data associated with a first user is also selected from data associated with a plurality of users (operation 506) and obtained (operation 508). The data associated with the first user may be selected and obtained responsive to determining that the first user generated the first content item and/or that at least a portion of the first content item is to be displayed to the first user. The data may include a geographical region associated with the first user, actions previously taken by the first user, a characteristic associated with the first user, and/or a preference of the first user. The data may also include data (e.g., content items) previously published by the first user or previously consumed by the first user.

Data associated with a second user may also optionally be selected and obtained from data associated with the plurality of users. The data associated with the second user may be obtained users based on an association between the second user and the first user. For example, the second user may be a team member, peer, family member, friend, coworker, teacher, student, and/or other relation of the first user. In another example, the first user may be a creator of the first content item, and the second user may be a consumer of one or more portions of the first content item.

The data is used to select a first tag for the first content item (operation 510), along with a ranked plurality of tags for the first content item (operation 512) that contains the first tag. The tags may be selected using a number of topic-mining, knowledge-extraction, and/or natural-language processing techniques. As a result, the tags may include keywords found in the first content item and/or keywords related to concepts, topics, or existing tags associated with the first content item. For example, the first tag may be selected based on a second tag that was selected for the first content item (e.g., by the creator of the first content item) and/or to replace a second tag that was selected for the first content item prior to selection of the first tag. In another example, the first tag may be selected to avoid one or more tags on a blacklist associated with the first user. The tags may then be ranked based on the relevance of the tags to the first content item and/or the popularity of each tag (e.g., according to the profile of the tag).

A second content item containing at least a portion of the first content item and one or more tags is then generated (operation 514) and published (operation 516). For example, the second content item may be published as a blog post, forum post, social network post, article, email, and/or other message that includes one or more words, phrases, sentences, paragraphs, and/or portions of the first content item. At least a subset of the ranked plurality of tags is also displayed (operation 518) with the second content item. The subset may include one or more tags that are relevant to the creator of the first content item, a consumer of the second content item, and/or a user related to the creator or consumer (e.g., peer, teacher, team member, coworker, friend, employee, family member, etc.). The subset may also avoid one or more tags on a blacklist associated with the creator and/or consumer.

Information associated with the first tag is also displayed (operation 520). For example, the information may be displayed in response to hovering a cursor over the first tag and/or otherwise interacting with the first tag. The information may include a contextual definition of the first tag, use (e.g., usage statistics) of the first tag, and/or other metadata associated with the first tag. The information may also include instructions to the creator of the first content item for selecting the tag for inclusion with the second content item.

Finally, the profile of the first tag is updated based at least on actions taken by one or more users (operation 522). For example, the profile of the first tag may be updated based on views, ratings, time spent, searches, browsing activity, clicks, and/or other actions associated with the first tag and/or second content item. The profile may then be used to update the subsequent inclusion of the first tag with other content items, use of the first tag with the context, and/or the position of the first tag in rankings of tags for the other content items.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
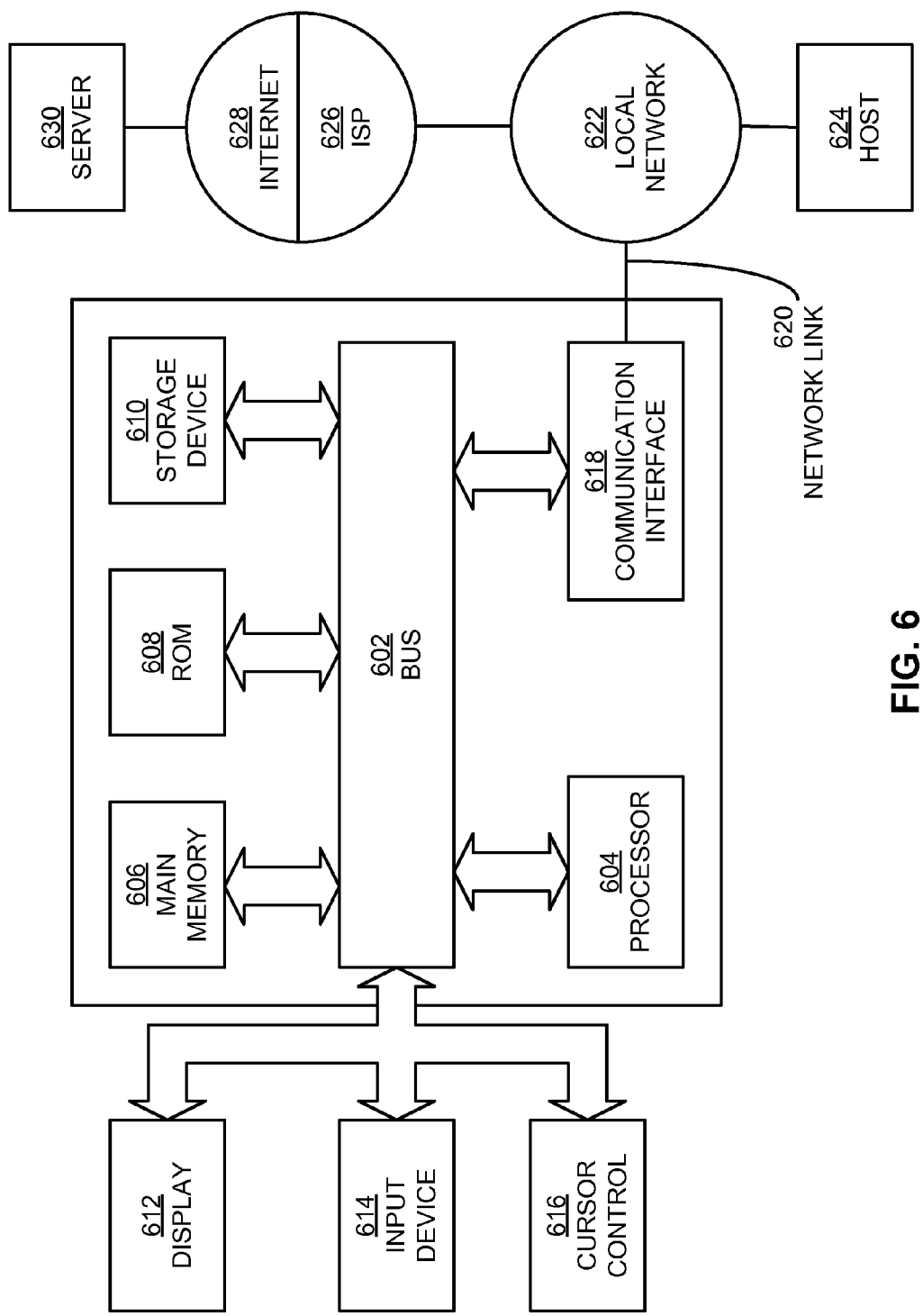
FIG. 6 illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   obtaining a first content item;
   determining that at least a portion of the first content item is to be displayed to a first user;
   responsive to determining that at least the portion of the first content item is to be displayed to the first user:
      obtaining characteristics associated with the first user;
      based on the characteristics associated with the first user, selecting a first tag for the first content item;
      generating a second content item comprising (a) at least the portion of the first content item and (b) the first tag;
      causing display of the second content item to the first user;
   determining that at least the portion of the first content item is to be displayed to a second user;
   responsive to determining that at least the portion of the first content item is to be displayed to the second user:
      obtaining characteristics associated with the second user;
      based on the characteristics associated with the second user, selecting a second tag for the first content item, the second tag being different from the first tag;
      generating a third content item comprising (a) at least the portion of the first content item and (b) the second tag; and
      causing display of the third content item to the second user.

2. The medium of claim 1, wherein the operations further comprise:
   displaying one or more recommended actions based at least on the first content item and the characteristics associated with the first user.

3. The medium of claim 1, wherein selecting the first tag for the first content item is based on characteristics associated with at least two users.

4. The medium of claim 1, wherein the operations further comprise:
   determining that the first content item is generated by a third user;
   responsive to determining that the first content item is generated by the third user:
      obtaining characteristics associated with the third user;
      wherein the first tag is selected based further on the characteristics associated with the third user.

5. The medium of claim 4, wherein at least a portion of the characteristics associated with the first user is different from at least a portion of the characteristics associated with the second user.

6. The medium of claim 1, wherein the first tag is selected based further on characteristics associated with a third user, wherein the data associated with the third user is selected from data associated with a plurality of users based on an association between the third user and the first user.

7. The medium of claim 1, wherein the operations further comprise:
   based on the characteristics associated with the first user, selecting a plurality of tags for the first content item;
   wherein the second content item comprises the plurality of tags.

8. The medium of claim 1, wherein the operations further comprise:
   based on the characteristics associated with the first user, selecting a ranked plurality of tags for the first content item; and
   displaying at least a subset of the ranked plurality of tags.

9. The medium of claim 1, wherein the first content item is a message generated by a third user to publish online, and wherein the second content item comprises the first tag as a tag in a hashtag.

10. The medium of claim 1, wherein the second content item further comprises at least a portion of a fourth content item that is determined to be relevant to (a) the portion of the first content item or (b) the first tag.

11. The medium of claim 1, wherein the characteristics associated with the first user comprises one or more of:
    characteristics of data previously published by the first user; or
    characteristics of data previously consumed by the first user.

12. The medium of claim 1, wherein the characteristics associated with the first user comprises one or more of:
    a geographical region associated with the first user;
    actions previously taken by the first user;
    a characteristic associated with the first user; or
    a preference of the first user.

13. The medium of claim 1, wherein the operations further comprise:
    prior to selecting the first tag for the first content item:
       creating a profile for the first tag based at least on prior usage associated with the first tag;
       wherein selecting the first tag for the first content item is further based on determining that the prior usage associated with the first tag is associated with at least the portion of the first content item.

14. The medium of claim 1, wherein the operations further comprise:
    displaying information associated with the first tag.

15. The medium of claim 1, wherein the first tag is selected based further on a third tag that was selected for the first content item.

16. The medium of claim 1, wherein selecting the first tag for the first content item comprises:
    selecting the first tag for the first content item, based on the characteristics associated with the first user, to replace a third tag that was selected for the first content item prior to selection of the first tag.

17. The medium of claim 1, wherein the operations further comprise publishing the second content item.

18. The medium of claim 1, wherein selecting the first tag comprises avoiding selecting of one or more tags on a blacklist associated with the first user.

19. The medium of claim 1, wherein the first user and the second user are different than a third user that generated the first content item.

20. A method comprising:
    obtaining a first content item;
    determining that at least a portion of the first content item is to be displayed to a first user;
    responsive to determining that at least the portion of the first content item is to be displayed to the first user:
       obtaining characteristics associated with the first user;

based on the characteristics associated with the first user, selecting a first tag for the first content item;
generating a second content item comprising (a) at least the portion of the first content item and (b) the first tag;
causing display of the second content item to the first user;
determining that at least the portion of the first content item is to be displayed to a second user;
responsive to determining that at least the portion of the first content item is to be displayed to the second user:
obtaining characteristics associated with the second user;
based on the characteristics associated with the second user, selecting a second tag for the first content item, the second tag being different from the first tag;
generating a third content item comprising (a) at least the portion of the first content item and (b) the second tag; and
causing display of the third content item to the second user;
wherein the method is performed by at least one device including a hardware processor.

21. A system comprising:
at least one device including a hardware processor;
the system being configured to perform operations comprising:
obtaining a first content item;
determining that at least a portion of the first content item is to be displayed to a first user;
responsive to determining that at least the portion of the first content item is to be displayed to the first user:
obtaining characteristics associated with the first user;
based on the characteristics associated with the first user, selecting a first tag for the first content item;
generating a second content item comprising (a) at least the portion of the first content item and (b) the first tag;
causing display of the second content item to the first user;
determining that at least the portion of the first content item is to be displayed to a second user;
responsive to determining that at least the portion of the first content item is to be displayed to the second user:
obtaining characteristics associated with the second user;
based on the characteristics associated with the second user, selecting a second tag for the first content item, the second tag being different from the first tag;
generating a third content item comprising (a) at least the portion of the first content item and (b) the second tag; and
causing display of the third content item to the second user.

* * * * *